(12) United States Patent
Tokarski et al.

(10) Patent No.: US 12,474,597 B2
(45) Date of Patent: Nov. 18, 2025

(54) COMPOUND MICROLENS DESIGN FOR HYPEROPIC PERIPHERAL DEFOCUS REDUCTION

(71) Applicant: Essilor International, Charenton-le-Pont (FR)

(72) Inventors: Zbigniew Tokarski, Dallas, TX (US); Ahmed Drammeh, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 556 days.

(21) Appl. No.: 17/906,330

(22) PCT Filed: Apr. 12, 2021

(86) PCT No.: PCT/EP2021/059455
§ 371 (c)(1),
(2) Date: Sep. 14, 2022

(87) PCT Pub. No.: WO2021/209394
PCT Pub. Date: Oct. 21, 2021

(65) Prior Publication Data
US 2023/0113340 A1    Apr. 13, 2023

(30) Foreign Application Priority Data
Apr. 14, 2020 (EP) .................................. 20315164

(51) Int. Cl.
*G02C 7/02* (2006.01)
(52) U.S. Cl.
CPC .................................. *G02C 7/022* (2013.01)
(58) Field of Classification Search
CPC ........................... G02C 7/022; G02C 2202/24

USPC ...................................................... 351/159.01
See application file for complete search history.

(56) References Cited

U.S. PATENT DOCUMENTS

| 11,914,228 B2 * | 2/2024 | Hones ........................ G02C 7/10 |
| 2017/0131567 A1 | 5/2017 | To et al. |
| 2017/0184875 A1 | 6/2017 | Newman |
| 2019/0212580 A1 | 7/2019 | To et al. |
| 2020/0012123 A1 | 1/2020 | Newman et al. |
| 2020/0089023 A1 | 3/2020 | Zhou et al. |

(Continued)

FOREIGN PATENT DOCUMENTS

| CN | 110068938 A | 7/2019 |
| CN | 110376758 A | 10/2019 |

(Continued)

OTHER PUBLICATIONS

International Search Report and Written Opinion mailed on Jun. 30, 2021 in PCT/EP2021/059455 filed on Apr. 12, 2021.

*Primary Examiner* — William R Alexander
(74) *Attorney, Agent, or Firm* — Oblon, McClelland, Maier & Neustadt, L.L.P.

(57) ABSTRACT

A spectacle lens is disclosed that includes compound microlenses arranged in a pattern. A compound microlens includes an on-axis microlenslet and an off-axis sub-lenslet located on the on-axis microlenslet. The off-axis sub-lenslet has a different optical functionality than the on-axis microlenslet. By selecting the appropriate compound microlens design, the addition of microlenslets with sub-lenslets around the periphery of the main structure optimizes the spectacle lens for myopia prevention, vertigo prevention, or any other visual related condition.

20 Claims, 6 Drawing Sheets

(56) References Cited

U.S. PATENT DOCUMENTS

| | | |
|---|---|---|
| 2020/0159044 A1 | 5/2020 | To et al. |
| 2021/0116720 A1* | 4/2021 | Guillot .................... G02C 7/06 |
| 2021/0165244 A1* | 6/2021 | Hones ..................... G02C 7/10 |
| 2022/0197059 A1* | 6/2022 | Zhou ..................... G02C 7/022 |

FOREIGN PATENT DOCUMENTS

| | | |
|---|---|---|
| WO | WO 2015/147758 A1 | 10/2015 |
| WO | WO 2020/069232 A1 | 4/2020 |

* cited by examiner

COMPOUND MICROLENS DESIGN FOR HYPEROPIC PERIPHERAL DEFOCUS REDUCTION

BACKGROUND

Technical Field

The present disclosure is directed to a spectacle lens for myopia control and prevention, antireflection, and correction of other visual impairments in human eyes. More specifically, an optical substrate may be incorporated with a compound microlens that includes microlenslets and off-axis sub-lenslets, in which the off-axis sub-lenslets have a different optical functionality than the microlenslet.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Figure 1:
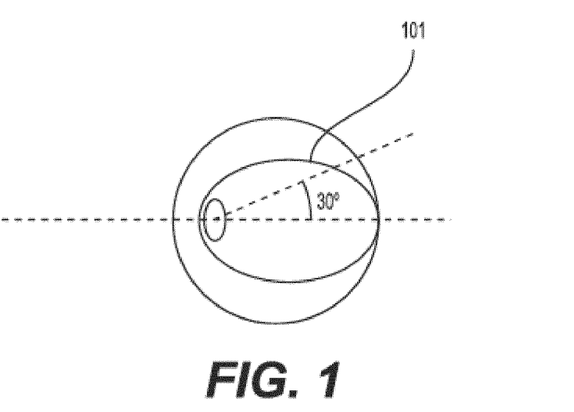
FIG. 1 illustrates hyperopic defocus in an eye.

The development of an eye towards myopia falls under the category known as emmetropization. This process is guided by visual input, and the mechanisms that coordinate this process are not fully understood. It is assumed that emmetropization occurs via an active mechanism by which defocus drives growth of the eye and that genetic factors and emmetropization both influence the growth of the eye's axis. FIG. 1 illustrates hyperopic defocus in an eye. It has long been assumed that wearing corrective spectacles might possibly hinder the process of emmetropization in young children, with this assumption being supported in particular also by animal studies. However, under-correction of myopia in humans has been shown to increase the rate of myopic progression. However, it is not yet fully understood for which patient groups, if any, the wearing of corrective spectacles in childhood actually impedes emmetropization.

Figure 2:
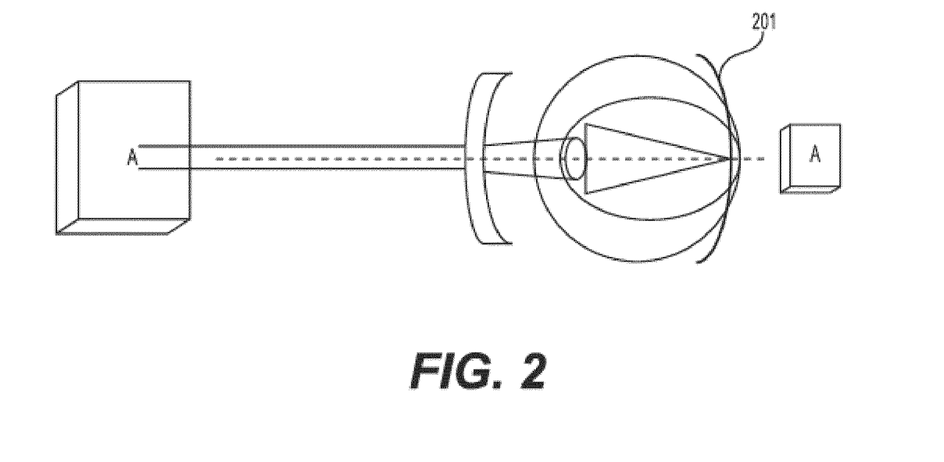
FIG. 2 illustrates peripheral defocus in an eye.

There has been some research on causal factors involved in the development of myopia. In particular, statistics show that prolonged near work correlates with the development of myopia, but it is still unclear whether a causal relationship exists. There are many hypotheses out there which explain the nature and onset and constant evolution of myopia, and one in particular deals with defocusing of the periphery. FIG. 2 illustrates peripheral defocus in an eye. In particular, the hypothesis states that local hyperopic defocus in the peripheral vision of the eye leads to eye elongation or growth. This phenomenon occurs even after the eye is corrected with a single vision lens device.

It is one object of the present disclosure to describe a design for a microlens that furthers the ability and flexibility of dealing with the evolution of myopia, and in particular dealing with defocusing of the periphery that leads to eye elongation or growth.

SUMMARY

A first aspect is a spectacle lens, comprising a plurality of compound microlenses arranged in a pattern; and at least one compound microlens of the plurality of microlenses includes an on-axis microlenslet, and at least one off-axis sub-lenslet located on the on-axis microlenslet, wherein the at least one off-axis sub-lenslet has a different optical functionality than the on-axis microlenslet.

Compound microlens designs may have one design for the on-axis microlenslets and several different designs of the off-axis sub-lenslets. The axis is a line, or optical axis, passing through the optical center of the microlens that is the reference for the terms on-axis and off-axis. The optical center of the microlens is the point at which light rays can pass with no deviation.

In a second aspect the at least one off-axis sub-lenslet has a different shape than the on-axis micro lenslet.

In a third aspect a center portion of the on-axis microlenslet provides optical power, and the at least one off-axis sub-lenslet provides peripheral defocus.

In a fourth aspect the on-axis microlenslet is a spherical shape and the at least one off-axis sub-lenslet is a spherical shape.

In a fifth aspect height of the on-axis microlenslet is less than or equal to two microns.

In a sixth aspect two sub-lenslets of the least one off-axis sub-lenslet are respectively located on a left portion and a right portion of the on-axis microlenslet.

In a seventh aspect three sub-lenslets of the least one off-axis sub-lenslet are located on apexes in a triangular arrangement around the on-axis microlenslet.

In an eighth aspect four sub-lenslets of the least one off-axis sub-lenslet are located on different opposing sides around the on-axis microlenslet.

In a ninth aspect the on-axis microlenslet is a spherical shape and the least one off-axis sub-lenslet is a concave sphere.

In a tenth aspect the on-axis microlenslet is one of a spherical shape, aspherical shape, prismatic shape, cylindrical shape, toric shape, semi-spherical shape, half cylindrical shape. In an eleventh aspect the at least one off-axis sub-lenslet is one of convex sphere, concave sphere, and prism shape.

In a twelfth aspect a plurality of the at least one off-axis sub-lenslets have different shapes.

In a thirteenth aspect the plurality of compound microlenslets are arranged in one quadrant of four of quadrants of the spectacle lens.

In a fourteenth aspect the plurality of compound microlenses are arranged such that the pattern is a ring pattern.

In a fifteenth aspect the ring pattern is a plurality of concentric rings.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

The present disclosure relates to the design of compound microlenses that contain multi-segmented microstructures scale features incorporated into a non-microstructure containing optical lens (plano or powered). These compound microlenslets can be incorporated directly on the surface of an optical lens substrate, incorporated on a single film or within a multi-film based laminate construction that will be incorporated as a wafer on an optical lens. The wafer can be a single design and material that can be used with several optical lens substrate materials. The present disclosure involves the use of off-axis microstructured sub-lenslets arrayed onto the optical lenses that have an optical (focus, defocus, convergence power, divergence power, prismatic) function that is different on the sides relative to the main central axis of the microlenslet that may have a different power function.

Compound microlens designs may have one design for the on-axis microlenslets and several different designs of the off-axis sub-lenslets. The axis is a line, or optical axis, passing through the optical center of the microlens that is the reference for the terms on-axis and off-axis. The optical center of the microlens is the point at which light rays can pass with no deviation. In the example shown in FIG. 8A, the on-axis microlenslet 801 is on the axis of the microlens, which is represented by a dot in the middle of the microlenslet 801. The off-axis lenslet 803 is offset from the axis of the microlens.

The disclosure relates to light-management of optical films as it relates to microstructures in applications dealing with Myopia control and prevention, antireflective surfaces, and for other visually related health impairments. The disclosure relates to various arrangements of microstructure designs on the surface of a substrate, on a film, or within a laminate structure.

The microstructure and the substrate may be made of either the same material or of materials compatible to each other to guarantee good bonding and optical clarity of the microstructure/substrate interface. Examples of same materials include but not limited to polycarbonate (PC), alicyclic polycarbonate copolymer, poly(methyl methacrylate) (PMMA), polyamide (PA), copolyester, polyester teraphthalate (PET), cellulose triacetate (TAC), thermoplastic polyurethane (TPU), and cyclic olefin copolymer (COC). Examples of dislike filament/carrier pairs include but not limited to PMMA/PC, Copolyester/PC, Polyester Alloy/PC, and Ali-cyclic Polycarbonate/PC. Non limiting examples of PMMA include Evonik ACRYLITE®, Arkema Altuglas®, and ChiMei ACRYREX®. Non limiting examples of Copolyester include Eastman TRITAN™ and SK Chemical Ecozen®. Non limiting examples of polyester alloy include Sabic XYLEX™. Non limiting examples of ali-cyclic polycarbonate include Mitsubishi Chemical Corporation DURABIO™ and Teijin Planext®. Non limiting examples of PC include Sabic Lexan™, Teijin Panlite®, and Covestro Makrolon®.

Typical examples of laminates include PC/PVA/PC, PC/PET/PC, and TAC/PVA/TAC polarizing laminates, PC/PU/PC and PC/TPU/PC photochromic laminates, PC/MOF (multi-layer optical film)/PC polarizing and/or blue cut and/or mirror laminates.

In some embodiments, the laminate structure is a polarizing laminate of multiple layers, where two or more of the layers are of different materials. Polarizing laminates include, but are not limited to, polycarbonate (PC)/polyvinyl alcohol (PVA)/PC, polycarbonate (PC)/polyester teraphthalate (PET)/PC, cellulose triacetate (TAC)/PVA/TAC, polyamide (PA)/PVA/PA, cyclic olefin copolymer (COC)/PVA/COC, thermoplastic polyurethane (TPU)/PVA/TPU, and PC/multi-layer optical film (MOF)/PC. Although the laminates are shown as symmetrical, non-symmetrical laminates may be used as well.

In some embodiments, the laminate structure is a photochromic laminate of multiple layers, where two or more of the layers are of different materials. Photochromatic laminates include, but are not limited to, polycarbonate (PC), /polyurethane (PU)/PC, PC/polyether block amide (PEBA)/PC, cellulose triacetate (TAC)/PU/TAC, TAC/PEBA/TAC, polyamide (PA)/PU/PA, PA/PEBA/PA, cyclic olefin copolymer (COC)/PU/COC, COC/PEBA/COC, and thermoplastic polyurethane (TPU)/PU/TPU, and TPU/PEBA/TPU. Although the laminates are shown as symmetrical, non-symmetrical laminates may be used as well.

In the context of the present disclosure, the term "lens" can refer to an uncut optical lens or a spectacle optical lens edged to fit a specific spectacle frame or an ophthalmic lens and an optical device adapted to be positioned on the ophthalmic lens. The optical device may be positioned on the front or back surface of the ophthalmic lens. The optical device may be an optical patch. The optical device may be adapted to be removably positioned on the ophthalmic lens for example a clip configured to be clipped on a spectacle frame comprising the ophthalmic lens.

U.S. Pat. No. 9,442,308 to Minghua Dai describes a multi-element lens for controlling defocus and eye diopter for prevention and treatment of myopia and hyperopia. According to Dai, the whole view region inside the human eye may be divided into a central view region, an equatorial view region, and a partial peripheral view region between the two other regions. The central visual field decides clear vision of human eye, while the equatorial view region has extremely small influence on clear vision of the human eye, but the eye growth and change in this region has the most significant effect on the size of ocular axis. Subsequently, the invention of Dai uses a method of optical defocus to design a multi-element lens.

In order to ensure full correction or non-excessive correction of hyperopia, Dai describes a design having small defocus or focus for the central view region of the eye, large defocus of convex lens with a degree smaller than the correction degree for the equatorial view region and medium defocus for other peripheral view regions, to create optical hyperopic defocus.

The multi-element lens includes a large unit convex lens for generating large defocus, one small unit concave lens that may be provided on the large unit convex lens, and a plurality of subunit concave lenses. Through the influences of light on the view regions of human eyes, the growth of the ocular axis can be effectively controlled, which achieves the characteristics of good prevention and treatment of myopia and hyperopia. In some cases, use of glasses may be stopped when a user's vision is stable.

Figure 3A:
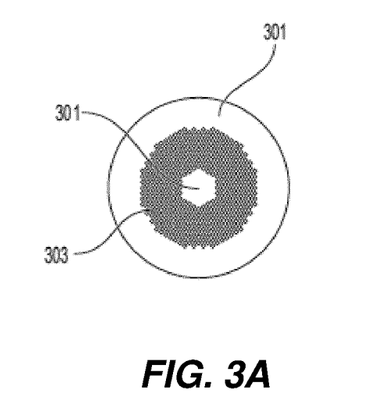
FIGS. 3A and 3B illustrate microlenses arrayed onto a single vision spectacle lens.
Figure 3B:
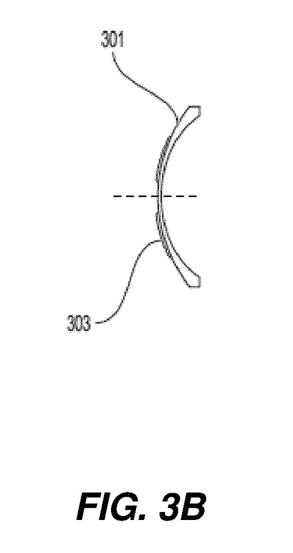

When forming a lens for suppressing the progress of myopia, second refraction areas may be made of the material having the function of focusing the image on the point in front of the retina of the eye. Thus, when the patient uses the lens of suppressing the progress of myopia for viewing the object, an image of the object is formed on the retina while an image is formed in front of the retina. Namely, this lens has an action of suppressing the progress of myopia by the image in front of the retina, which is the action obtained by the refractive power other than the first refractive power, while visually recognizing the image of the object formed by the first refractive power. FIGS. 3A and 3B illustrate microlenses arrayed onto a single vision spectacle lens. A particular spectacle lens has a first refraction area 301 having a first refractive power based on a prescription for correcting myopia, and second refraction areas 303 formed as a plurality of respectively independent island-shaped areas in the vicinity of a center part of the lens.

An alternative embodiment of this lens is illustrated in WO2019/166659 which discusses a lens element intended to be worn in front of an eye of a person to suppress or reduce progression of abnormal refractions of the eye such as myopia or hyperopia. The present disclosure goes beyond the current approach of using simple microlens designs (e.g., spherical, aspheric, prismatic) having isotropic power across its geometry to an approach that optimizes the optical function based on complex microlenslet designs, and their size, placement, and density on the main optical lens. For example, having a variable power within one sub-lenslet may lower accommodation lag distance to prevent the rapid elongation of the adolescent eyes (myopia prevention).

The present disclosure relates to the use of compound microlenses, arrayed onto the surfaces of optical lenses that have optical functions that are different on off-axis sides relative to the central on-axis microlenslet. The compound microlenses can have multiple optical functionalities, for example the central microlenslet portion optical power and the off-axis portion of the microlens provides peripheral defocus.

The sub-lenslet design allows for independent control of the off-axis light to either converge or diverge light relative to the shape of the back of the eye. Whereas the on-axis portion of the lens focuses light onto the macular portion of the eye (central retina) that is responsible for seeing fine details.

The shape of the microlenslets, the shape of the sub-lenslets, and the arrangement of one or a plurality of sub-lenslet around the axis of the micrlenslet, may be non-symmetrical. Advantageously, those features allow an accurate, customized and asymmetrical control of the light coming through each portion of the lens.

Under normal circumstances, an already myopic eye suffers a hyperopic defocus of ~0.8 Diopter on average. This value represents the disparity between the position of the already elongated eye-ball, as opposed to its original position. As a consequence of this defocus, the eye struggles through large accommodation lag. By design, the addition of microlenses around the periphery helps reduce the large distance of accommodative lag, which an already myopic eye wearing a corrective single vision (SV) lens suffers from. By adding more microlenses at the off-axis area, around the periphery of a microlens, with tailorable powers anywhere between (+1 Diopters to +3.5 Diopters), the lag distance can be further decreased. This further decrease in lag helps bring the image even closer to the eyes retina, ultimately preventing the eye from having to elongate further to accommodate the object, which under normal circumstances exacerbates myopia progression.

The present innovation offers greater latitude to have a multitude of optical powers within the same microstructure, expanding its potential efficacy and effectiveness.

Figure 4:
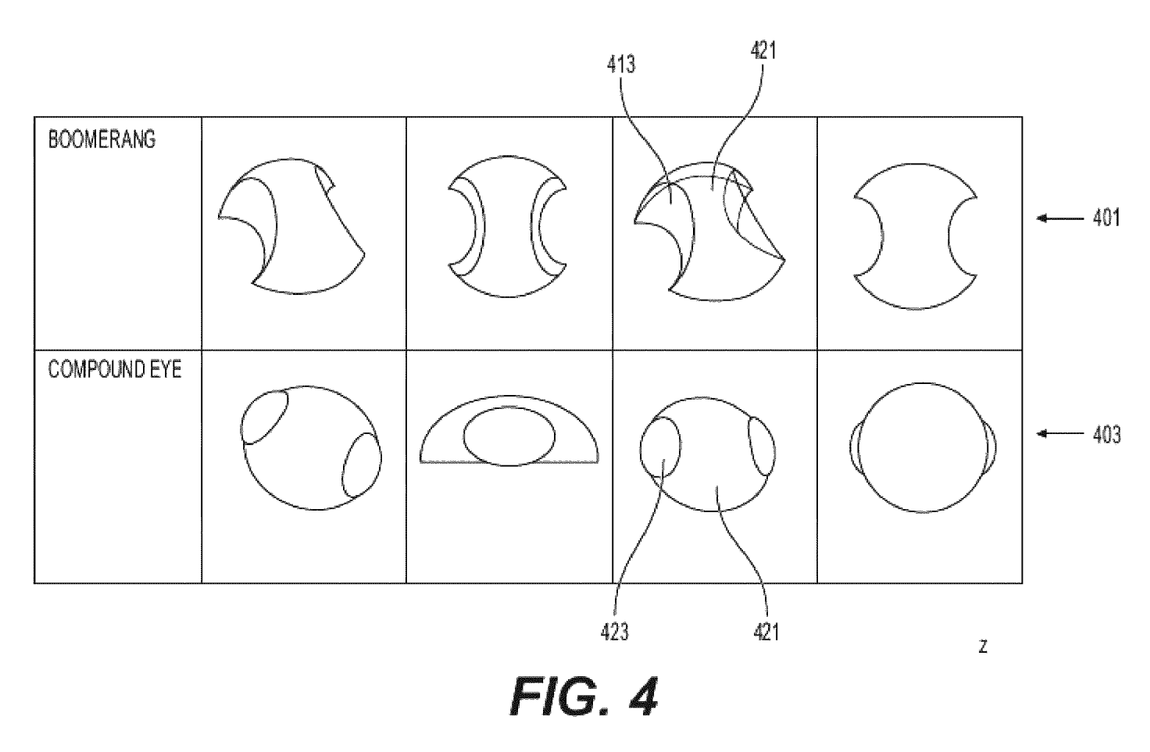
FIG. 4 illustrates shapes of compound microlenses in accordance with exemplary aspects of the disclosure.

Examples of compound microlenses that incorporate off-primary axis microstructured sub-lenslets are shown in the FIG. 4 (Boomerang 401 and Compound Eye 403). As illustrated in FIG. 4, the off-axis sub-lenslets may be concave 413, or convex 423, or flat, on the surface of a respective microlenslet 411, 421.

Compound microlens designs may have one design for the on-axis microlenslets and several different designs of the off-axis sub-lenslets.

Figure 5:
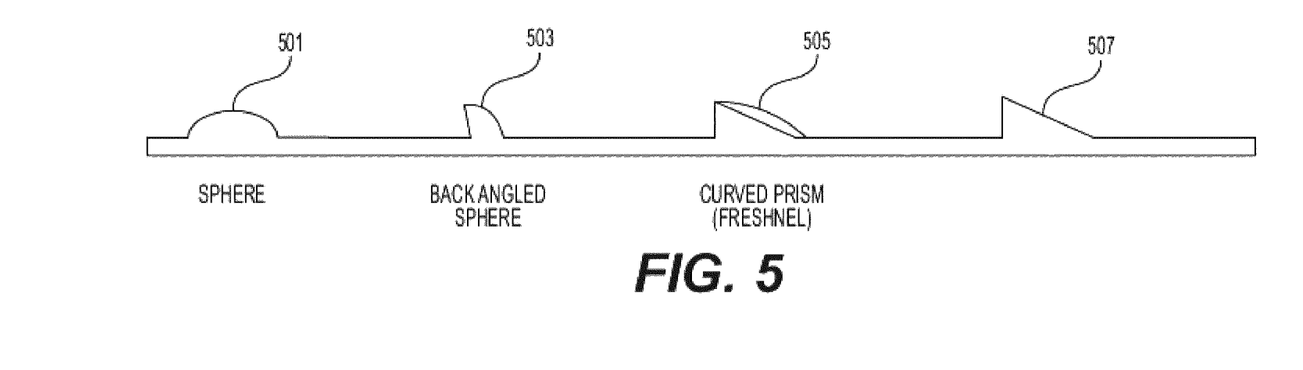
FIG. 5 illustrates profile views of an on-axis microlenslet in accordance with exemplary aspects of the disclosure.
Figure 6:
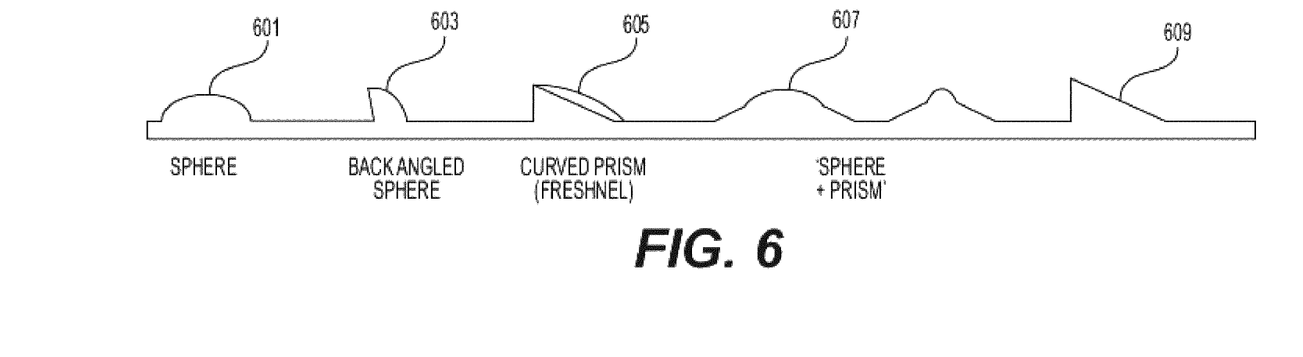
FIG. 6 illustrates profile views of an off-axis sub-lenslet in accordance with exemplary aspects of the disclosure.
Figure 7A:
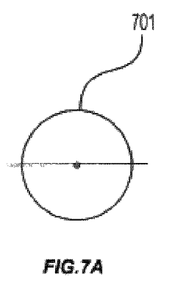
FIG. 7A to 7I illustrate three-dimensional perspective views of an on-axis microlenslet or an off-axis sub-lenslet in accordance with exemplary aspects of the disclosure.
Figure 7B:
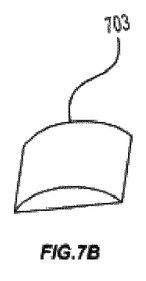
Figure 7C:
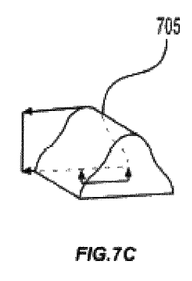
Figure 7D:
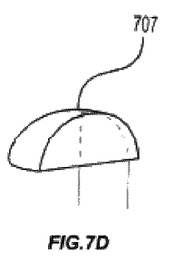
Figure 7E:
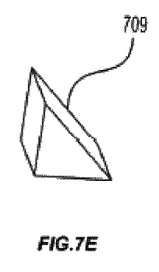
Figure 7F:
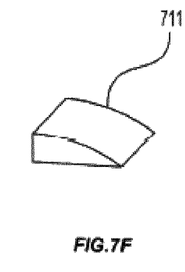
Figure 7G:
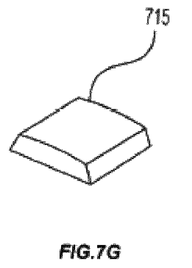
Figure 7H:
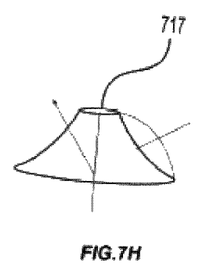
Figure 7I:
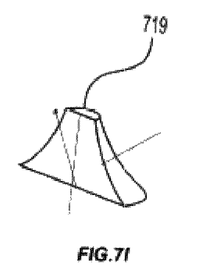

FIG. 5 illustrates profile views of an on-axis microlenslet in accordance with exemplary aspects of the disclosure. The on-axis microlenslet design may be one of the following shapes: spherical 501, 503, aspherical, prismatic (curved) 505 (conventional) 507, cylindrical, toric, sphero-toric or other known optical design. FIG. 6 illustrates profile views of an off-axis sub-lenslet in accordance with exemplary aspects of the disclosure. The off-axis sub-lenslet 423 may be any of the shapes of the microlenslet: spherical 601, angled spherical 603, curved prism 605, spherical prism 607, conventional prism 609. However, the off-axis sub-lenslets vary in i) the location around the on-axis shape (left, right, top, bottom portion of the on-axis microlenslet from the perspective of the viewer looking out at an image), ii) the size of the shape, iii) radius of curvature, iv) slope of the prism, v) quadrant of the overall eye lens, and other positions. There may be any number of sub-lenslets and the sub-lenslets could be configured in pairs (e.g. 2, 4, 6, etc.) or independently (e.g. 1, 3, 5, 7, etc.). The sub-lenslets may be disposed across from one another in a pattern or randomly on the microlenslet.

FIG. 7A to 7I illustrate three-dimensional perspective views of an on-axis microlenslet or an off-axis sub-lenslet in accordance with exemplary aspects of the disclosure. The on-axis microlenslet design or the off-axis sub-lenslet may be one of the following shapes: spherical 701 on FIG. 7A, partial cylindrical 703 on FIG. 7B, aspherical 705 on FIG. 7C, 717 on FIG. 7H, 719 on FIG. 7I, prismatic (curved) 707 on FIG. 7D, prismic (conventional) 709 on FIG. 7E, quarter cylindrical 711 on FIG. 7F, toric, or other known optical design 715 on FIG. 7G. A microlenslet may range from about 0.25 mm to 2 mm or less in diameter and about 1 to 5 microns in height.

Figure 8A:
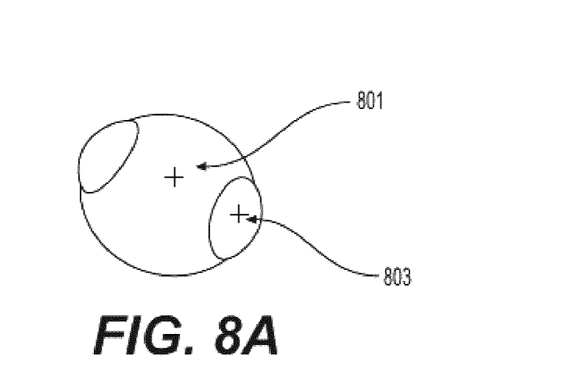
FIGS. 8A, 8B, 8C illustrate examples of compound microlenses in accordance with exemplary aspects of the disclosure.
Figure 8B:
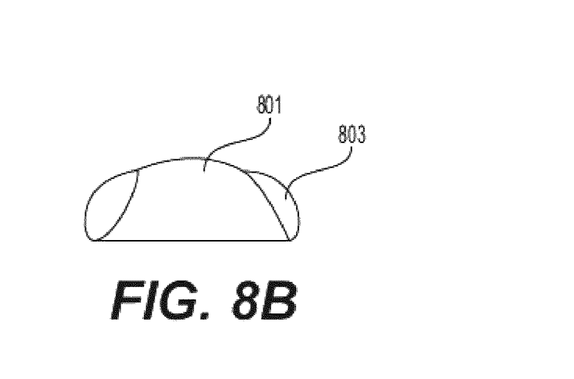
Figure 8C:
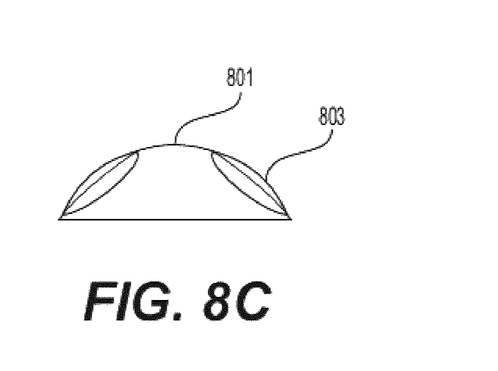

FIGS. 8A, 8B, 8C illustrate examples of compound microlenses in accordance with exemplary aspects of the disclosure. The example of a compound microlens of FIG. 8A, the center on-axis shape 801 is spherical and the sub-lenslet shapes 803 are also spherical. Looking at a cross section of this microlens the off-axis sub-lenslet structures 803 may be convex spheres, concave spheres, prisms, or other common optical shapes including sphere, cylindrical, toric, prism, or flat prism as well as other geometrical shapes, for example parabolic, hyperbolic, pseudospherical, and tractricoidal conical.

There are many potential causes for vertigo including inner ear infections, migraines, Meniere disease, BPPV and the like. Eye care professional are just beginning to explore many visual related health issues, for example certain light blocking lenses help reduce migraines (in general) and migraine-associated vertigo. Also, patients with vertigo triggered by visual stimuli including moving, tilted, busy, and disorienting visual fields, may be helped by specially adapted lenses (for example, blocking, redirecting, or defocusing peripheral light) that may reduce/eliminate the visual stimuli triggering vertigo.

By selecting the appropriate compound microlens design, the addition of microstructures around the periphery of the main structure may optimize the mechanism for myopia prevention, visual vertigo prevention, or any other visual health related condition.

The compound microlens can be used to produce customized lens designs for each wearer by changing the compound microlenses that incorporate off-primary axis microstructured sub-lenslets design and positioning them on custom eyewear.

(1) A spectacle lens, including a plurality of compound microlenses arranged in a pattern; and at least one compound microlens of the plurality of microlenses includes an on-axis microlenslet, and at least one off-axis sub-lenslet located on the on-axis microlenslet, in which the at least one off-axis sub-lenslet has a different optical functionality than the on-axis microlenslet.

(2) The spectacle lens according to (1), in which the at least one off-axis sub-lenslet has a different shape than the on-axis microlenslet.

(3) The spectacle lens according to (1) or (2), in which a center portion of the on-axis microlenslet provides optical power, and the at least one off-axis sub-lenslet provides peripheral defocus.

(4) The spectacle lens according to any of (1) to (3), in which the on-axis microlenslet is a spherical shape and the at least one off-axis sub-lenslet is a spherical shape.

(5) The spectacle lens according to any of (1) to (4), in which height of the on-axis microlenslet is less than or equal to two microns.

(6) The spectacle lens according to any of (1) to (5), in which two sub-lenslets of the least one off-axis sub-lenslet are respectively located on a left portion and a right portion of the on-axis microlenslet.

(7) The spectacle lens according to any of (1) to (6), in which three sub-lenslets of the least one off-axis sub-lenslet are located on apexes in a triangular arrangement around the on-axis microlenslet.

(8) The spectacle lens according to any of (1) to (7), in which four sub-lenslets of the least one off-axis sub-lenslet are located on different opposing sides around the on-axis microlenslet.

(9) The spectacle lens according to any of (1) to (8), in which the on-axis microlenslet is a spherical shape and the least one off-axis sub-lenslet is a concave sphere.

(10) The spectacle lens according to any of (1) to (9), in which the on-axis microlenslet is one of a spherical shape, aspherical shape, prismatic shape, cylindrical shape, toric shape, semi-spherical shape, half cylindrical shape.

(11) The spectacle lens according to any of (1) to (10), in which the at least one off-axis sub-lenslet is one of convex sphere, concave sphere, and prism shape.

(12) The spectacle lens according to any of (1) to (11), in which a plurality of the at least one off-axis sub-lenslet have different shapes.

(13) The spectacle lens according to any of (1) to (12), in which the plurality of compound microlenslets are arranged in one quadrant of four of quadrants of the spectacle lens.

(14) The spectacle lens according to any of (1) to (13), in which the plurality of compound microlenses are arranged such that the pattern is a ring pattern.

(15) The spectacle lens according to (14), in which the ring pattern is a plurality of concentric rings.

Numerous modifications and variations of the present invention are possible in light of the above teachings. It is therefore to be understood that within the scope of the appended claims, the invention may be practiced otherwise than as specifically described herein.

The invention claimed is:

1. A spectacle lens, comprising:
a plurality of compound microlenses arranged in a pattern; and
at least one compound microlens of the plurality of microlenses includes:
an on-axis microlenslet, and
at least one off-axis sub-lenslet located on the on-axis microlenslet,
wherein the at least one off-axis sub-lenslet has a different optical functionality than the on-axis microlenslet.

2. The spectacle lens according to claim 1, wherein the at least one off-axis sub-lenslet has a different shape than the on-axis microlenslet.

3. The spectacle lens according to claim 1, wherein a center portion of the on-axis microlenslet provides optical power, and the at least one off-axis sub-lenslet provides peripheral defocus.

4. The spectacle lens according to claim 3, wherein the on-axis microlenslet is a spherical shape and the at least one off-axis sub-lenslet is a spherical shape.

5. The spectacle lens according to claim 3, wherein height of the on-axis microlenslet is less than or equal to two microns.

6. The spectacle lens according to claim 3, wherein two sub-lenslets of the least one off-axis sub-lenslet are respectively located at two different positions on the on-axis microlenslet.

7. The spectacle lens according to claim 3, wherein three sub-lenslets of the least one off-axis sub-lenslet are located on apexes in a triangular arrangement around the on-axis microlenslet.

8. The spectacle lens according to claim 3, wherein four sub-lenslets of the least one off-axis sub-lenslet are located on different opposing sides around the on-axis microlenslet.

9. The spectacle lens according to claim 3, wherein the on-axis microlenslet is a spherical shape and the least one off-axis sub-lenslet is a concave sphere.

10. The spectacle lens according to claim 3, wherein the on-axis microlenslet is one of a spherical shape, aspherical shape, prismatic shape, cylindrical shape, toric shape, semi-spherical shape, half cylindrical shape.

11. The spectacle lens according to claim 3, wherein the at least one off-axis sub-lenslet is one of convex sphere, concave sphere, and prism shape.

12. The spectacle lens according to claim 3, wherein a plurality of the at least one off-axis sub-lenslet have different shapes.

13. The spectacle lens according to claim 3, wherein the plurality of compound microlenses are arranged in one quadrant of four of quadrants of the spectacle lens.

14. The spectacle lens according to claim 3, wherein the plurality of compound microlenses are arranged such that the pattern is a ring pattern.

15. The spectacle lens according to claim 14, wherein the ring pattern is a plurality of concentric rings.

16. The spectacle lens according to claim 2, wherein a center portion of the on-axis microlenslet provides optical power, and the at least one off-axis sub-lenslet provides peripheral defocus.

17. The spectacle lens according to claim 1, wherein the on-axis microlenslet is a spherical shape and the at least one off-axis sub-lenslet is a spherical shape.

18. The spectacle lens according to claim 2, wherein the on-axis microlenslet is a spherical shape and the at least one off-axis sub-lenslet is a spherical shape.

19. The spectacle lens according to claim 1, wherein two sub-lenslets of the least one off-axis sub-lenslet are respectively located at two different positions on the on-axis microlenslet.

20. The spectacle lens according to claim 2, wherein two sub-lenslets of the least one off-axis sub-lenslet are respectively located at two different positions on the on-axis microlenslet.

\* \* \* \* \*